US 9,711,014 B2

(12) United States Patent
Cruz-Hernandez et al.

(10) Patent No.: US 9,711,014 B2
(45) Date of Patent: Jul. 18, 2017

(54) SYSTEMS AND METHODS FOR GENERATING HAPTIC EFFECTS ASSOCIATED WITH TRANSITIONS IN AUDIO SIGNALS

(71) Applicant: Immersion Corporation, San Jose, CA (US)

(72) Inventors: Juan Manuel Cruz-Hernandez, Montreal (CA); Jamal Saboune, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/078,438

(22) Filed: Nov. 12, 2013

(65) Prior Publication Data

US 2015/0070146 A1    Mar. 12, 2015

Related U.S. Application Data

(60) Provisional application No. 61/874,933, filed on Sep. 6, 2013.

(51) Int. Cl.
*H04B 3/36* (2006.01)
*G08B 6/00* (2006.01)
(Continued)

(52) U.S. Cl.
CPC ............... *G08B 6/00* (2013.01); *G06F 3/016* (2013.01); *G06K 9/00523* (2013.01); *G10H 7/02* (2013.01);
(Continued)

(58) Field of Classification Search
CPC .... G06F 3/016; G06F 1/163; G06F 2203/011; G06F 19/322; G06F 19/3418;
(Continued)

(56) References Cited

U.S. PATENT DOCUMENTS 4,250,637 A     2/1981  Scott
6,397,154 B1 *  5/2002  Jones .................... G06F 17/156
                                                455/67.12
(Continued)

FOREIGN PATENT DOCUMENTS

EP          2 624 099            8/2013
WO     WO 9827802 A2 *  7/1998   ............. H04B 1/707
(Continued)

OTHER PUBLICATIONS

European Patent Office, Extended Search Report, European Application No. 14183983, dated Apr. 9, 2015.
(Continued)

*Primary Examiner* — Emily C Terrell
(74) *Attorney, Agent, or Firm* — Kilpatrick Townsend & Stockton LLP

(57) ABSTRACT

Systems and methods for generating haptic effects associated with transitions in audio signals are disclosed. One disclosed system for outputting haptic effects includes a processor configured to: receive a signal; determine a haptic effect based in part on the signal; output a haptic signal associated with the haptic effect; an audio output device configured to receive the signal and output an audible effect; and a haptic output device in communication with the processor and coupled to the touch surface, the haptic output device configured to receive the haptic signal and output the haptic effect.

36 Claims, 9 Drawing Sheets

(51) Int. Cl.
    *G09B 21/00*     (2006.01)
    *G06F 3/01*     (2006.01)
    *G06K 9/00*     (2006.01)
    *G10L 21/06*     (2013.01)
    *G10H 7/02*     (2006.01)

(52) U.S. Cl.
    CPC ........ *G10L 21/06* (2013.01); *G10H 2220/096* (2013.01); *G10H 2220/311* (2013.01)

(58) Field of Classification Search
    CPC ........ G06F 19/345; G06F 3/005; G06F 3/011; B06B 1/045; G09B 21/003; G08B 6/00
    USPC ............. 340/407.1–407.2, 7.6; 704/219–223
    See application file for complete search history.

(56) References Cited

U.S. PATENT DOCUMENTS

| | | | |
|---|---|---|---|
| 6,408,696 B1 * | 6/2002 | Jong | G01R 23/16 324/76.21 |
| 7,020,701 B1 * | 3/2006 | Gelvin | G01D 21/00 250/332 |
| 7,208,671 B2 * | 4/2007 | Chu | G06F 3/016 345/156 |
| 7,761,204 B2 | 7/2010 | Konig | |
| 8,068,025 B2 | 11/2011 | Devenyi et al. | |
| 8,493,354 B1 | 7/2013 | Birnbaum et al. | |
| 8,593,420 B1 | 11/2013 | Buuck | |
| 8,896,524 B2 | 11/2014 | Birnbaum et al. | |
| 8,976,980 B2 | 3/2015 | Tsutsui et al. | |
| 2007/0178942 A1 | 8/2007 | Sadler et al. | |
| 2008/0123725 A1 * | 5/2008 | J | H04B 3/48 375/224 |
| 2009/0096632 A1 | 4/2009 | Ullrich et al. | |
| 2009/0231276 A1 * | 9/2009 | Ullrich et al. | 345/157 |
| 2009/0306985 A1 | 12/2009 | Roberts et al. | |
| 2010/0067710 A1 * | 3/2010 | Hendriks | G10L 21/0208 381/58 |
| 2010/0228530 A1 * | 9/2010 | Valero | E21B 43/26 703/2 |
| 2010/0268745 A1 | 10/2010 | Choi et al. | |
| 2010/0274817 A1 | 10/2010 | Choi et al. | |
| 2011/0063208 A1 | 3/2011 | Van den Eerenbeemd et al. | |
| 2011/0093100 A1 * | 4/2011 | Ramsay | 700/94 |
| 2011/0099596 A1 | 4/2011 | Ure | |
| 2011/0102160 A1 * | 5/2011 | Heubel et al. | 340/407.1 |
| 2011/0125787 A1 | 5/2011 | Choi et al. | |
| 2011/0125788 A1 | 5/2011 | Joo et al. | |
| 2011/0125789 A1 | 5/2011 | Joo et al. | |
| 2011/0125790 A1 | 5/2011 | Joo et al. | |
| 2011/0137137 A1 | 6/2011 | Shin et al. | |
| 2011/0188832 A1 | 8/2011 | Choi et al. | |
| 2011/0216179 A1 | 9/2011 | Dialameh et al. | |
| 2011/0254671 A1 | 10/2011 | Okimoto et al. | |
| 2012/0019352 A1 | 1/2012 | Menard et al. | |
| 2012/0028577 A1 | 2/2012 | Rodriguez et al. | |
| 2012/0032906 A1 | 2/2012 | Lemmens et al. | |
| 2012/0059697 A1 | 3/2012 | Lin et al. | |
| 2012/0150928 A1 | 6/2012 | Ward et al. | |
| 2012/0200520 A1 | 8/2012 | Harris | |
| 2012/0206247 A1 | 8/2012 | Bhatia et al. | |
| 2012/0310587 A1 * | 12/2012 | Tu | G01D 1/16 702/141 |
| 2013/0245980 A1 * | 9/2013 | Forbes et al. | 702/86 |
| 2013/0278536 A1 | 10/2013 | Nakamura et al. | |
| 2013/0325456 A1 * | 12/2013 | Takagi et al. | 704/210 |
| 2014/0039796 A1 * | 2/2014 | Thompson | G01V 11/007 702/11 |
| 2014/0055358 A1 | 2/2014 | Birnbaum et al. | |
| 2014/0237495 A1 | 8/2014 | Jang et al. | |
| 2014/0347177 A1 | 11/2014 | Phan et al. | |
| 2015/0070150 A1 | 3/2015 | Levesque et al. | |
| 2015/0070265 A1 | 3/2015 | Cruz-Hernandez et al. | |

FOREIGN PATENT DOCUMENTS

| | | |
|---|---|---|
| WO | WO 03/032289 | 4/2003 |
| WO | WO 2004/030341 | 4/2004 |
| WO | WO 2005/048541 | 5/2005 |
| WO | WO 2013/096327 | 6/2013 |

OTHER PUBLICATIONS

United States Patent and Trademark Office, Office Action, U.S. Appl. No. 14/145,650 dated May 8, 2015.
Lee, J. et al., Haptic Interaction with User Manipulation for Smartphone, 2013 IEEE International Conference on Consumer Electronics (ICCE), pp. 47-48, XP 032348660, Jan. 2013.
European Patent Office, European Search Report, European Application No. 14183978, dated Mar. 20, 2015.
European Patent Office, European Search Report, European Application No. 14183980, dated Mar. 31, 2015.
European Patent Office, European Search Report, European Application No. 14183981, dated Mar. 25, 2015.
United States Patent and Trademark Office, Office Action, U.S. Appl. No. 14/145,650, dated Mar. 26, 2015.
United States Patent and Trademark Office, Office Action, U.S. Appl. No. 14/078,442, dated Apr. 3, 2015.
United States Patent and Trademark Office, Office Action, U.S. Appl. No. 14/078,445 dated Nov. 18, 2015.
United States Patent and Trademark Office, Office Action, U.S. Appl. No. 14/078,442 dated Jan. 6, 2016.
United States Patent and Trademark Office, Office Action, U.S. Appl. No. 14/078,442 dated Mar. 16, 2016.
United States Patent and Trademark Office, Office Action, U.S. Appl. No. 14/145,650 dated Feb. 23, 2016.
United States Patent and Trademark Office, Office Action, U.S. Appl. No. 14/078,442 dated May 27, 2016.
United States Patent and Trademark Office, Office Action, U.S. Appl. No. 14/145,450 dated May 26, 2016.
United States Patent and Trademark Office, Office Action, U.S. Appl. No. 14/078,445 dated Oct. 25, 2016.
United States Patent and Trademark Office, Office Action, U.S. Appl. No. 14/145,650 dated Sep. 23, 2016.

* cited by examiner

SYSTEMS AND METHODS FOR GENERATING HAPTIC EFFECTS ASSOCIATED WITH TRANSITIONS IN AUDIO SIGNALS

CROSS REFERENCE TO RELATED APPLICATIONS

This application claims priority to U.S. Provisional Application No. 61/874,933 filed on Sep. 6, 2013 and entitled "Audio to Haptics" the entirety of which is hereby incorporated herein by reference.

This application is related to U.S. patent application Ser. No. 14/078,442, filed the same day as the present application and entitled "Systems and Methods for Generating Haptic Effects Associated with an Envelope in Audio Signals," the entirety of which is hereby incorporated herein by reference.

This patent application is related to U.S. patent application Ser. No. 14/078,445, filed the same day as the present application and entitled "Systems and Methods for Generating Haptic Effects Associated with Audio Signals," the entirety of which is hereby incorporated herein by reference.

FIELD OF THE INVENTION

The present invention generally relates to haptic feedback and more particularly to systems and methods for generating haptic effects associated with transitions in signals.

BACKGROUND

Touch-enabled devices have become increasingly popular. For instance, mobile and other devices may be configured with touch-sensitive displays so that a user can provide input by touching portions of the touch-sensitive display. As another example, a touch-enabled surface separate from a display may be used for input, such as a trackpad, mouse, or other device. Furthermore, some touch-enabled devices make use of haptic effects, for example, haptic effects configured to simulate a texture or a friction on a touch-surface. In some devices these haptic effects may correlate to audio or other effects output by the device. However, due to latency in processing and outputting the audio and haptic effects, these effects may be less compelling. Thus, there is a need for improved haptic effects associated with audio effects.

SUMMARY

Embodiments of the present disclosure include devices featuring haptic effects felt on a touch area and associated with audio signals. These haptic effects may include, but are not limited to, changes in texture, changes in coefficient of friction, and/or simulation of boundaries, obstacles, or other discontinuities in the touch surface that can be perceived through use of an object in contact with the surface.

In one embodiment, a system of the present disclosure may comprise a processor configured to: receive a signal; determine a haptic effect based in part on the signal; and output a haptic signal associated with the haptic effect; an audio output device configured to receive the signal and output an audible effect; and a haptic output device in communication with the processor and coupled to the touch surface, the haptic output device configured to receive the haptic signal and output the haptic effect.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1A:
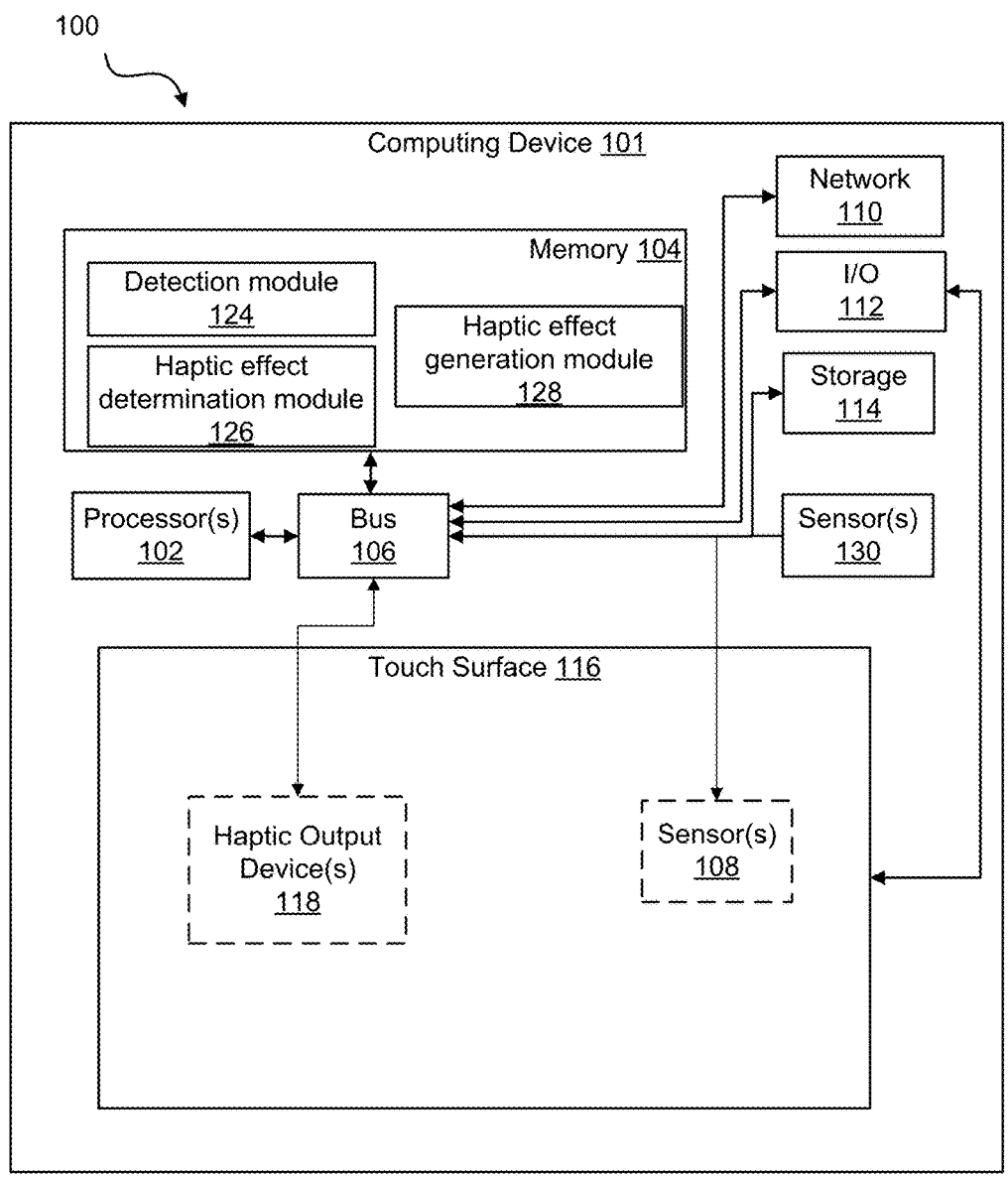
FIG. 1A shows an illustrative system for generating haptic effects associated with transitions in audio signals.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device for Generating Haptic Effects Associated with Transitions in Audio Signals One illustrative embodiment of the present disclosure comprises a computing system, such as a smartphone, tablet, or portable music device. In some embodiments, the computing system may comprise a wearable device, or be embedded in furniture or clothes. The computing system can include and/or may be in communication with one or more sensors, such as an accelerometer, as well as sensors (e.g., optical, resistive, or capacitive) for determining a location of a touch relative to a display area corresponding in this example to the screen of the device.

As the user interacts with the device, one or more haptic output devices, for example, actuators are used to provide haptic effects. For example, a haptic effect may be output to simulate the presence of a texture on the surface of the device. In one such embodiment, as the user's finger moves across the surface, a vibration, electric field, or other effect may be output to simulate the feeling of a texture on the surface of the device. Similarly, in another embodiment, as the user moves a finger across the device, the perceived coefficient of friction of the screen can be varied (e.g., increased or decreased) based on the position, velocity, and/or acceleration of the finger or the length of time the finger has been in contact with the device. In other embodiments, the mobile device may output haptic effects such as vibrations, pops, clicks, or surface deformations. In some embodiments, haptic effects may be output for a certain period of time (e.g., 50 ms) when a certain event occurs. In other embodiments, the haptic effect may vary with a fixed period, e.g., in an embodiment, a texture may be output that varies at a 100 Hz rate, e.g., a 100 Hz sinusoid.

In the illustrative embodiment, the haptic effect comprises an effect associated with an audio signal. For example, in some embodiments, the haptic effect may comprise a haptic effect associated with an audio track. In some embodiments, the user may be listening to the audio track (e.g., using headphones, speakers, or some other type of audio output device) at the time the haptic effect is determined. In other embodiments, the haptic effect may be determined in advance as part of a "haptic track." This haptic track may be distributed along with the audio file, so that it may be played alongside the audio track. In some embodiments, the haptic track may be synched to the audio track such that haptic effects correspond to events in the audio track. In other embodiments, the haptic effect may be associated with an Audio-Visual ("AV") track, for example, the audio portion of a video file.

In one illustrative embodiment, the computing device may determine the haptic effects by determining locations of transitions in an audio signal. In some embodiments these transitions may comprise changes in amplitude, frequency, or other changes in the audio signal. For example, in one embodiment, a transition may comprise a change from audio output by an orchestra to audio output by people speaking. In other embodiments, the transition may comprise a more subtle change, such as a change in the tone of voice of a speaker. The present disclosure includes further description of example methods for determining the location of a transition in an audio signal.

In some embodiments, the haptic effects may be output in a coordinated or synchronized form along with the audio file. In some embodiments, a simple filtering technique (e.g., low pass filtering) may be used to automatically determine haptic effects from an audio or an AV file. However, such a method may result in poor synchronization between the haptic effects and the audio events. This may result in lower quality haptic effects as perceived by the user. Determining the location of transitions in the audio file enables better synchronization of haptic effects to audible effects. In some embodiments, better synchronization may occur if the haptic effect starts at the same time the audio or AV event starts.

As will be discussed in further detail below, any number of features may be found in an audio signal. Embodiments of the present disclosure provide systems and methods for identifying these features, and then determining and outputting haptic effects that are synchronized with these features. Further, in some embodiments, the systems and methods discussed herein may be used to determine haptic effects associated with other types of signals, e.g., pressure, acceleration, velocity, or temperature signals.

Illustrative Systems for Generating Haptic Effects Associated with Transitions in Audio Signals FIG. 1A shows an illustrative system 100 for generating haptic effects associated with transitions in audio signals. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., a transceiver/antenna for accessing a CDMA, GSM, UMTS, or other mobile communications network(s)).

I/O components 112 may be used to facilitate connection to devices such as one or more displays, keyboards, mice, speakers, microphones, cameras, and/or other hardware used to input data or output data. For example, in some embodiments, I/O components 112 may include speakers configured to play audio signals provided by processor 102. Storage 114 represents nonvolatile storage such as magnetic, optical, or other storage media included in device 101. In some embodiments, storage 114 may be configured to store audio files configured to be played to the user via I/O components 112.

System 100 further includes a touch surface 116, which, in this example, is integrated into device 101. Touch surface 116 represents any surface that is configured to sense touch input of a user. One or more sensors 108, 130 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position. In some embodiments, sensor 108 and touch surface 116 may comprise a touch screen or a touch-pad. For example, in some embodiments, touch surface 116 and sensor 108 may comprise a touch screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, 130, for example, a first touch screen and a second touch screen. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal.

Device 101 further comprises a haptic output device 118. In the example shown in FIG. 1A haptic output device 118 is in communication with processor 102 and is coupled to touch surface 116. In some embodiments, haptic output device 118 is configured to output a haptic effect simulating a texture on the touch surface in response to a haptic signal. Additionally or alternatively, haptic output device 118 may provide vibrotactile haptic effects that move the touch surface in a controlled manner. Some haptic effects may utilize an actuator coupled to a housing of the device, and some haptic effects may use multiple actuators in sequence and/or in concert. For example, in some embodiments, a surface texture may be simulated by vibrating the surface at different frequencies. In such an embodiment, haptic output device 118 may comprise one or more of, for example, a piezoelectric actuator, an electric motor, an electro-magnetic actuator, a voice coil, a shape memory alloy, an electroactive polymer, a solenoid, an eccentric rotating mass motor (ERM), or a linear resonant actuator (LRA). In some embodiments, haptic output device 118 may comprise a plurality of actuators, for example an ERM and an LRA. In some embodiments, the haptic device 118 may comprise or be embedded in a wearable device, furniture, or clothing.

Although a single haptic output device 118 is shown here, embodiments may use multiple haptic output devices of the same or different type to output haptic effects, for example, to simulate surface textures or vary the perceived coefficient of friction on the touch surface. For example, in one embodiment, a piezoelectric actuator may be used to displace some or all of touch surface 116 vertically and/or horizontally at ultrasonic frequencies, such as by using an actuator moving at frequencies greater than 20-25 kHz in some embodiments. In some embodiments, multiple actuators such as eccentric rotating mass motors and linear resonant actuators can be used alone or in concert to provide different textures, variations in the coefficient of friction, or other haptic effects.

In still other embodiments, haptic output device 118 may apply electrostatic friction or attraction, for example, by use of an electrostatic surface actuator, to simulate a texture on the surface of touch surface 116. Similarly, in some embodiments, haptic output device 118 may use electrostatic attraction to vary the friction the user feels on the surface of touch surface 116. For example, in one embodiment, haptic output device 118 may comprise an electrostatic display or any other device that applies voltages and currents instead of mechanical motion to generate a haptic effect. In such an embodiment, an electrostatic actuator may comprise a conducting layer and an insulating layer. In such an embodiment, the conducting layer may be any semiconductor or other conductive material, such as copper, aluminum, gold, or silver. And the insulating layer may be glass, plastic, polymer, or any other insulating material. Furthermore, the processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier. In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116 or vary the coefficient of friction felt as the object moves across the surface of touch surface 116. Furthermore, in some embodiments, an electrostatic actuator may be used in conjunction with traditional actuators to vary the simulated texture on the surface of touch surface 116. For example, the actuators may vibrate to simulate a change in the texture of the surface of touch surface 116, while at the same time; an electrostatic actuator may simulate a different texture, or other effects, on the surface of touch surface 116.

One of ordinary skill in the art will recognize that, in addition to varying the coefficient of friction, other techniques or methods can be used to, for example, simulate a texture on a surface. In some embodiments, a texture may be simulated or output using a flexible surface layer configured to vary its texture based upon contact from a surface reconfigurable haptic substrate (including, but not limited to, e.g., fibers, nanotubes, electroactive polymers, piezoelectric elements, or shape memory allows) or a magnetorheological fluid. In another embodiment, surface texture may be varied by raising or lowering one or more surface features, for example, with a deforming mechanism, air or fluid pockets, local deformation of materials, resonant mechanical elements, piezoelectric materials, micro-electromechanical systems ("MEMS") elements, thermal fluid pockets, MEMS pumps, variable porosity membranes, or laminar flow modulation.

In some embodiments an electrostatic actuator may be used to generate a haptic effect by stimulating parts of the body near or in contact with the touch surface 116. For example, in some embodiments an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches the touch surface 116 and moves his or her finger on the touch surface, the user may sense a texture of prickliness, graininess, bumpiness, roughness, stickiness, or some other texture.

Further, in some embodiments, multiple actuators may be used to output haptic effects. This may serve to increase the range of effects that haptic output devices 118 can output. For example, in some embodiments, vibrating actuators may be used in coordination with electrostatic actuators to generate a broad range of effects. In still further embodiments, additional types of haptic output devices, such as devices configured to deform a touch surface, may be used in coordination with other haptic output devices, such as vibrating actuators.

Turning to memory 104, exemplary program components 124, 126, and 128 are depicted to illustrate how a device may be configured to generate haptic effects associated with transitions in audio signals. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time.

Haptic effect determination module 126 represents a program component that analyzes audio data, such as data from an audio effect, to select a haptic effect to generate. Particularly, module 126 comprises code that determines, based on the audio data, a type of haptic effect to output.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of effect and utilize signal processing algorithms to generate an appropriate signal to send to haptic output device 118. Some embodiments may utilize multiple haptic output devices in concert to output the haptic effect. In some embodiments, processor 102 may stream or transmit the haptic signal to the haptic output device 118.

Figure 1B:
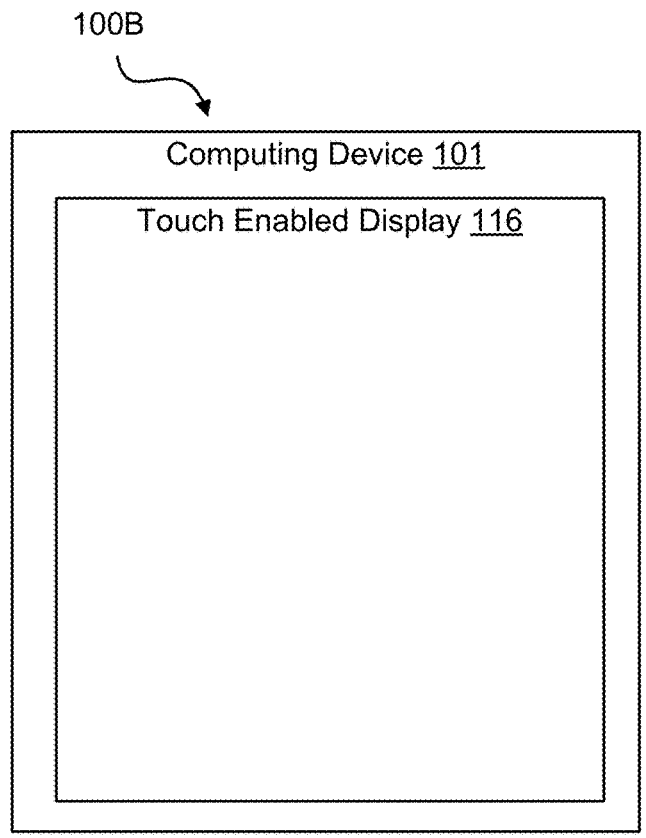
FIG. 1B shows an external view of one embodiment of the system shown in FIG. 1A.

A touch surface may or may not overlay (or otherwise correspond to) a display, depending on the particular configuration of a computing system. In FIG. 1B, an external view of a computing system 100B is shown. Computing device 101 includes a touch enabled display 116 that combines a touch surface and a display of the device. The touch surface may correspond to the display exterior or one or more layers of material above the actual display components.

Figure 1C:
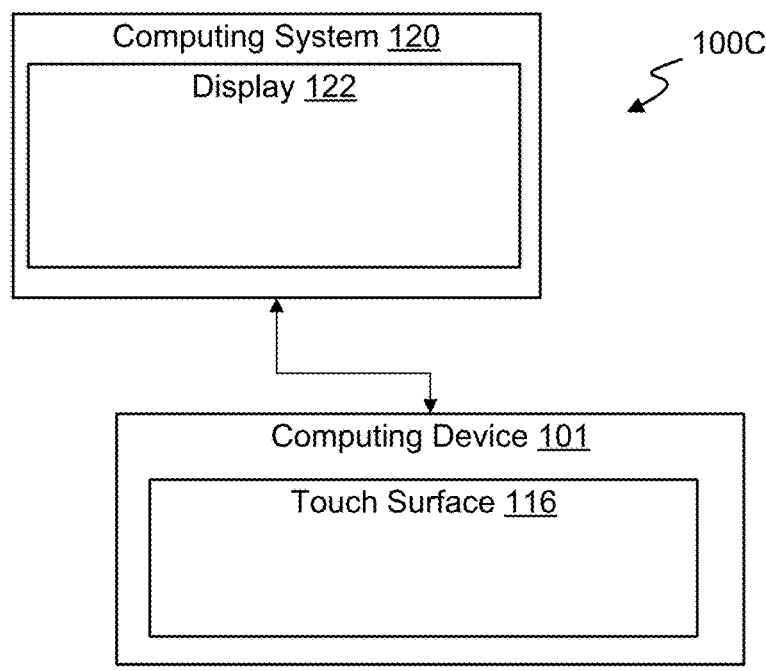
FIG. 1C illustrates an external view of another embodiment of the system shown in FIG. 1A.

FIG. 1C illustrates another example of a touch-enabled computing system 100C in which the touch surface does not overlay a display. In this example, a computing device 101 comprises a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer comprising display 122. Whether integrated with a display or otherwise, the depiction of planar touch surfaces in the examples herein is not meant to be limiting. Other embodiments include curved or irregular touch enabled surfaces that are further configured to provide surface-based haptic effects.

Figure 2A:
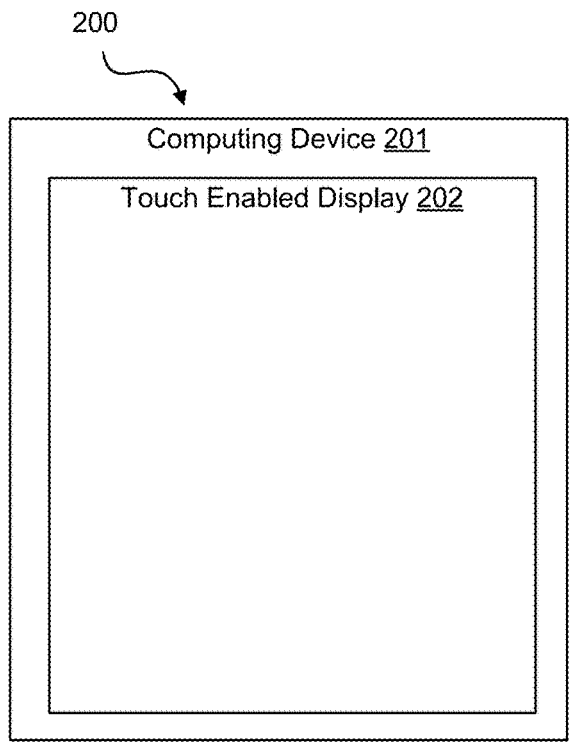
FIG. 2A illustrates an example embodiment for generating haptic effects associated with transitions in audio signals.
Figure 2B:
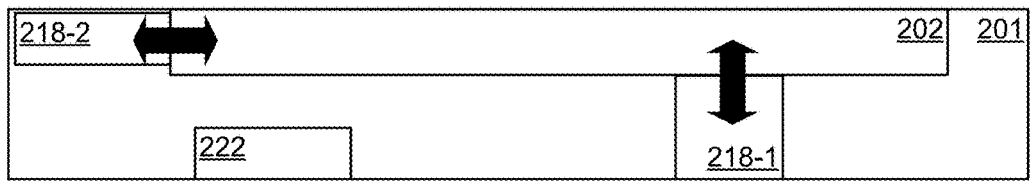
FIG. 2B illustrates an example embodiment for generating haptic effects associated with transitions in audio signals.

FIGS. 2A-2B illustrate an example of devices that may generate haptic effects associated with transitions in audio signals. FIG. 2A is a diagram illustrating an external view of a system 200 comprising a computing device 201 that comprises a touch enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 features a plurality of haptic output devices 218 and an additional haptic output device 222. Haptic output device 218-1 may comprise an actuator configured to impart vertical force to display 202, while 218-2 may move display 202 laterally. In this example, the haptic output devices 218 and 222 are coupled directly to the display, but it should be understood that the haptic output devices 218 and 222 could be coupled to another touch surface, such as a layer of material on top of display 202. Furthermore, it should be understood that one or more of haptic output devices 218 or 222 may comprise an electrostatic actuator, as discussed above. Furthermore, haptic output device 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional haptic output device 222 comprises an eccentric rotating mass motor, a linear resonant actuator, or another piezoelectric actuator. Haptic output device 222 can be configured to provide a vibrotactile haptic effect in response to a haptic signal from the processor. The vibrotactile haptic effect can be utilized in conjunction with surface-based haptic effects and/or for other purposes. For example, each actuator may be used in conjunction to output a vibration, simulate a texture, or vary the coefficient of friction on the surface of display 202.

In some embodiments, either or both haptic output devices 218-1 and 218-2 can comprise an actuator other than a piezoelectric actuator. Any of the actuators can comprise a piezoelectric actuator, an electromagnetic actuator, an electroactive polymer, a shape memory alloy, a flexible composite piezo actuator (e.g., an actuator comprising a flexible material), electrostatic, and/or magnetostrictive actuators, for example. Additionally, haptic output device 222 is shown, although multiple other haptic output devices can be coupled to the housing of device 201 and/or haptic output devices 222 may be coupled elsewhere. Device 201 may comprise multiple haptic output devices 218-1/218-2 coupled to the touch surface at different locations, as well.

Figure 3:
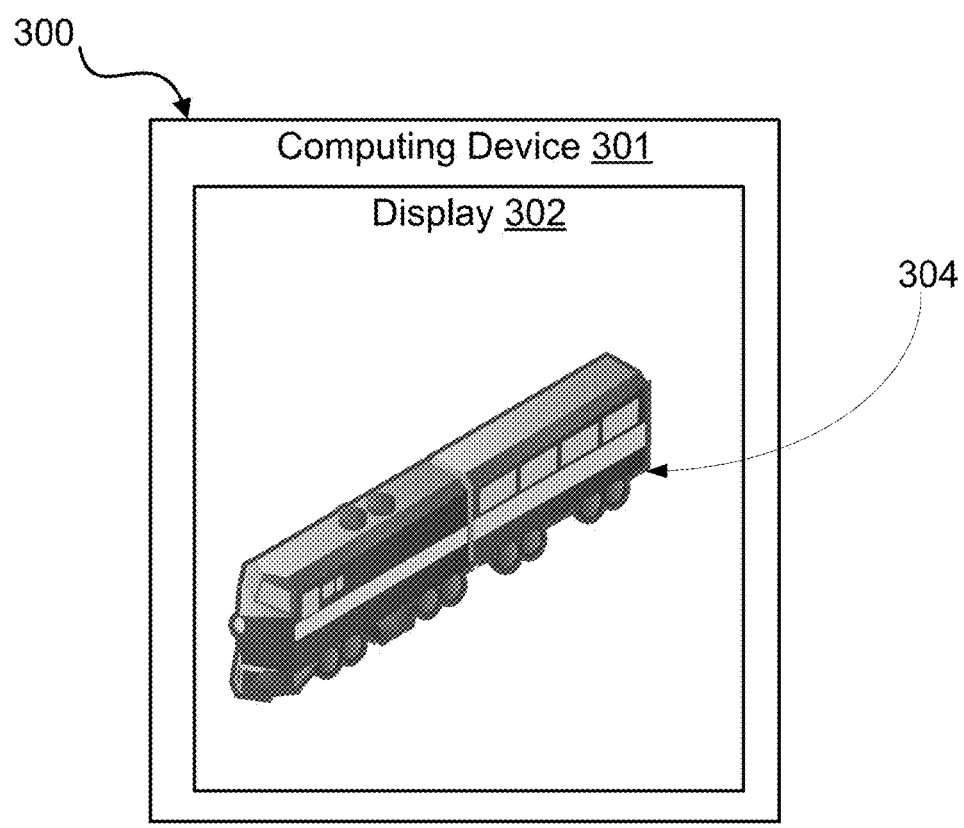
FIG. 3 illustrates an example embodiment for generating haptic effects associated with transitions in audio signals according to one embodiment.

Turning now to FIG. 3, FIG. 3 shows one embodiment of a system for generating haptic effects associated with transitions in audio signals according to the present disclosure. The system 300 shown in FIG. 3 comprises a computing device 301, with a display 302 showing a video comprising a train 304. In some embodiments computing device 301 may comprise a handheld computing device, e.g., a mobile phone, a tablet, a music player, or a laptop computer. In another embodiment, computing device 301 may comprise a multifunction controller. For example, a controller for use in a kiosk, ATM, or other computing device. Further, in one embodiment, computing device 301 may comprise a controller for use in a vehicle.

The video 304 may further comprise audible effects played by audio output devices (e.g., speakers or headphones) coupled to the computing device 301 (not shown in FIG. 3). Embodiments of the present disclosure comprise methods for determining haptic effects based on the audio signal. For example, some embodiments may separate the audio signal from the video signal, and then perform various operations, discussed in further detail below, to determine haptic effects to output alongside the audio track.

In some embodiments, display 302 may comprise a touch enabled display. Further, rather than displaying a video, display 302 may provide the user with a graphical user interface, e.g., a graphical user interface for a kiosk, ATM, stereo system, car dashboard, telephone, computer, music player, or some other graphical user interface known in the art. In such an embodiment, computing device 301 may determine haptic effects based on audio signals associated with the graphical user interface. For example, in some embodiments the graphical user interface may comprise audio effects output when the user interacts with icons, buttons, or other interface elements. In some embodiments, computing device 301 may further determine haptic effects associated with one or more of these audio effects. In some embodiments, the computing device 301 may derive haptic effects from transitions in the audio signal or any other sensor derived signal, e.g., signals from sensors such as user interfaces, accelerometers, gyroscopes, Inertial Measurement Units, etc.

In some embodiments, a video signal may not be included. For example, in some embodiments, haptic effects may be played alongside an audio track that is not associated with a video. In such an embodiment, the systems and methods disclosed herein may operate on the audio signal, in real time, as the signal is being played or at a time in advance of the signal being played. For example, in some embodiments, an audio signal may be processed to determine a haptic track, which is stored on a data store for playing in the future. In such an embodiment, the haptic track may be determined by the computing device that plays the haptic track. In other embodiments, the haptic track may be created by the author or distributor of the audio track. In such an embodiment, the author or distributor may distribute the haptic track along with the audio track.

Figure 4:
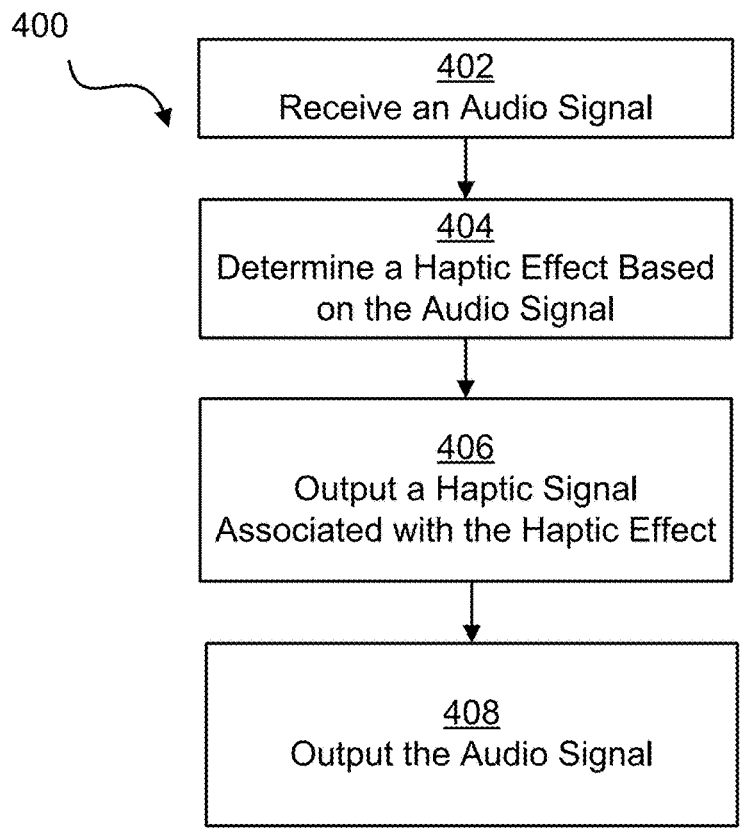
FIG. 4 illustrates a flow chart for a method for generating haptic effects associated with transitions in audio signals according to one embodiment.
Figure 5:
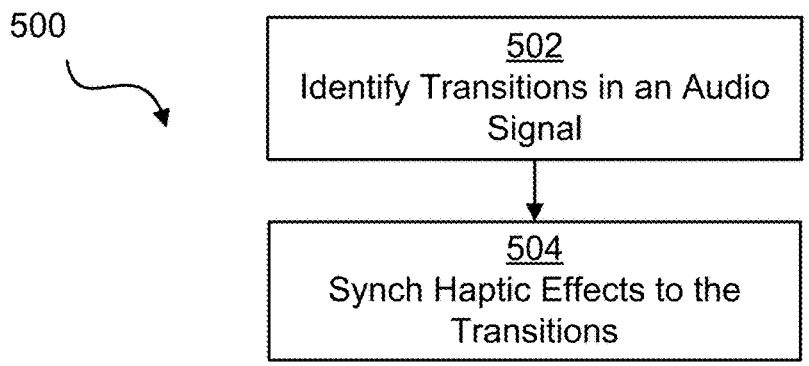
FIG. 5 illustrates a flow chart for a method for generating haptic effects associated with transitions in audio signals according to one embodiment.

Illustrative Methods for Generating Haptic Effects Associated with Transitions in Audio Signals FIGS. 4 and 5 are flowcharts showing illustrative methods 400 and 500 for generating haptic effects associated with transitions in audio signals. In some embodiments, the steps in flow charts 400 and 500 may be implemented in program code executed by a processor, for example, the processor in a general purpose computer, mobile device, or server. In some embodiments, these steps may be implemented by a group of processors. In some embodiments the steps shown in FIGS. 4 and 5 may be performed in a different order. Alternatively, in some embodiments, one or more of the steps shown in FIGS. 4 and 5 may be skipped or additional steps not shown in FIGS. 4 and 5 may be performed. The steps in FIGS. 4 and 5 are described with regard to an audio signal. However, in some embodiments, the methods may be used to determine haptic effects associated with other types of signals, e.g., pressure, acceleration, velocity, or temperature signals. The steps below are described with reference to components described above with regard to system 100 shown in FIG. 1A.

The method 400 begins when processor 102 receives an audio signal 402. In some embodiments the audio signal may comprise a signal associated with a video playing on computing device 101. In other embodiments, the audio signal may comprise a signal associated with an audio file that is currently playing on computing device 101. In still other embodiments, the audio signal may be associated with an audio file that is stored locally on a computing device 101 or stored on a remote server. For example, in some embodiments, the audio signal may comprise an audio file that is stored on a server and downloaded to the user on demand.

The method 400 continues when processor 102 determines a haptic effect based on the audio signal 404. In some embodiments, the haptic effect may comprise a vibration output by one or more haptic output device(s) 118. In some embodiments, this vibration may be used to enhance the user's perception of an audio track playing on the computing device 101. Similarly, in some embodiments, the first haptic effect may comprise a variation in the coefficient of friction on touch surface 116. In other embodiments, the haptic effect may comprise a simulated texture on the surface of touch surface 116 (e.g., the texture of one or more of: water, grass, ice, metal, sand, gravel, brick, fur, leather, skin, fabric, rubber, leaves, or any other available texture).

In some embodiments, processor 102 may rely on programming contained in haptic effect determination module 126 to determine the haptic effect. For example, the processor 102 may access drive signals stored in memory 104 and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

Further, in some embodiments, users may be able to select a vibration, texture, variance in the coefficient of friction, or other haptic effect associated with an audio file in order to customize computing device 101. For example, in some embodiments, a user may select a haptic effect such as a surface texture to allow for personalization of the feel of a touch interface. In some embodiments, this haptic effect may be associated with a ringtone, e.g., for an incoming call, email, text message, alarm, or other event. In some embodiments, the user may select these personalized haptic effects or surface textures through modifying settings or downloading software associated with particular effects. In other embodiments, the user may designate effects through detected interaction with the device. In some embodiments, this personalization of haptic effects may increase the user's sense of ownership and the connection between the user and his or her device.

In still other embodiments, device manufacturers, artists, videographers, or software developers may select distinctive haptic effects, such as surface textures, to brand their devices, user interfaces, or artistic works (e.g., songs, videos, or audio tracks). In some embodiments, these haptic effects may be unique to branded devices and similar to other distinctive elements that may increase brand awareness. For example, many mobile devices and tablets may comprise a custom or branded home screen environment. For example, in some embodiments, devices produced by different manufacturers may comprise the same operating system; however, manufacturers may distinguish their devices by modifying this home screen environment. Similarly, videos or audio tracks produced by a certain company may comprise a specific type of haptic effect. Thus, in some embodiments, some device manufacturers, production companies, or software developers may use haptic effects such as textures or friction based effects to create a unique and differentiated user experience.

The method 400 continues when processor 102 outputs a haptic signal associated with the haptic effect 406. The processor 102 outputs the haptic signal to a haptic output device 118 configured to output the haptic effect. In some embodiments, haptic output device 118 may output the haptic effect onto touch surface 116. In some embodiments haptic output device 118 may comprise traditional actuators such as piezoelectric actuators or electric motors coupled to touch surface 116 or other components within computing device 101. In other embodiments haptic output device 118 may comprise electrostatic actuators configured to simulate textures or vary coefficients of friction using electrostatic fields. In some embodiments, processor 102 may control a plurality of haptic output devices to simulate multiple haptic effects. For example, in one embodiment, processor 102 may control an electrostatic actuator to simulate a texture on the surface of touch surface 116 and processor 102 may further control other haptic output devices 118 to simulate other features. For example, haptic output devices 118 may comprise actuators configured to output other effects, such as vibrations configured to simulate barriers, detents, movement, or impacts on touch surface 116. In some embodiments, processor 102 may coordinate the effects so the user can feel a plurality of effects together when interacting with touch surface 116.

Then processor 102 outputs the audio signal 408. In some embodiments, processor 102 may output the audio signal to an audio output device such as a speaker, headphone, or ear bud. In some embodiments, the audio output device may be integrated into computing device 101. In other embodiments, the audio output device may be coupled to computing device 101. Further, in some embodiment, the audio signal may be synchronized to the haptic effects, e.g., in some embodiments, the haptic effect may be output substantially simultaneously as a corresponding audio effect.

Turning now to FIG. 5, FIG. 5 is a flowchart showing an illustrative method 500 for determining haptic effects associated with transitions in audio signals. The method 500 begins at step 502 when processor 102 identifies transitions in an audio signal. Various example methods for identifying transitions in an audio signal are discussed in further detail below. In some embodiments, these transitions may be associated with changes in the audio signal, such as changes in the amplitude or frequency of the audio signal. These changes may be associated with, for example, a change in musical instrument, a scene change in a movie, a change in source (e.g., a change in speaker), or some other transition commonly found in audio files.

The method 500 continues at step 504 when processor 102 synchs haptic effects to the transitions. In some embodiments, synching haptic effects to the transitions comprises configuring the processor 102 to output a haptic signal associated with the haptic effect at a time that substantially corresponds to the audio effect. In some embodiments, the processor 102 may output the haptic effects at the time of the transition. In other embodiments, the haptic effects may be output at some period after the transition. For example, in some embodiments, the processor 102 may output a haptic effect that acts as an echo. For example, in one embodiment, the audio track may comprise a sound simulating a gunshot. In such an embodiment, the processor may determine a haptic effect that coincides with the audio effect. The processor may further determine a second haptic effect to be output a few second later to simulate an echo associated with the gunshot.

In some embodiments, the transition maps to locations where the signal ramps up or ramps down. These transitions may then be used to identify events within the audio signal, which may be tagged with haptic markers for generating haptic effects. In the example given above, the transition may correspond to an event such as a gunshot. In some embodiments, rather than determining a haptic effect, processor 102 may apply a haptic marker to that location in the audio file. This haptic marker may be used by processor 102, or another processor, to determine a haptic effect when playing the audio file.

Illustrative Methods for Identifying Transitions in Audio Signals

Figure 6:
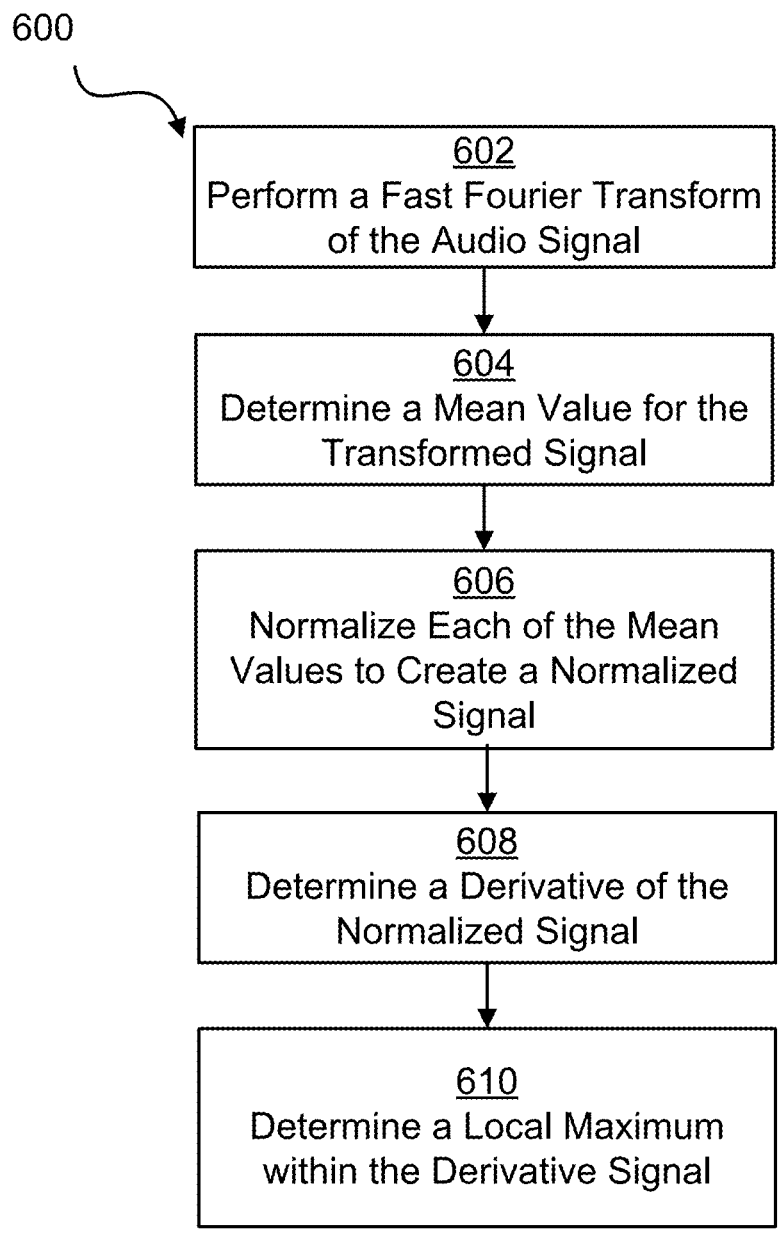
FIG. 6 illustrates a flow chart for a method for identifying transitions in audio signals according to one embodiment.

FIG. 6 is a flowchart showing an illustrative method 600 for identifying transitions in an audio signal, which may be used for determining haptic effects associated with the audio signal. In some embodiments, the steps shown in FIG. 6 may be implemented in program code executed by a processor, for example, the processor in a general purpose computer, mobile device, or server. In some embodiments, these steps may be implemented by a group of processors. In some embodiments the steps shown in FIG. 6 may be performed in a different order. Alternatively, in some embodiments, one or more of the steps in FIG. 6 may be skipped, or additional steps not shown in FIG. 6 may be performed. The steps in FIG. 6 are described with regard to an audio signal. However, in some embodiments, the method may be used to determine haptic effects associated with other types of signals, e.g., pressure, acceleration, velocity, or temperature signals.

Figure 7:
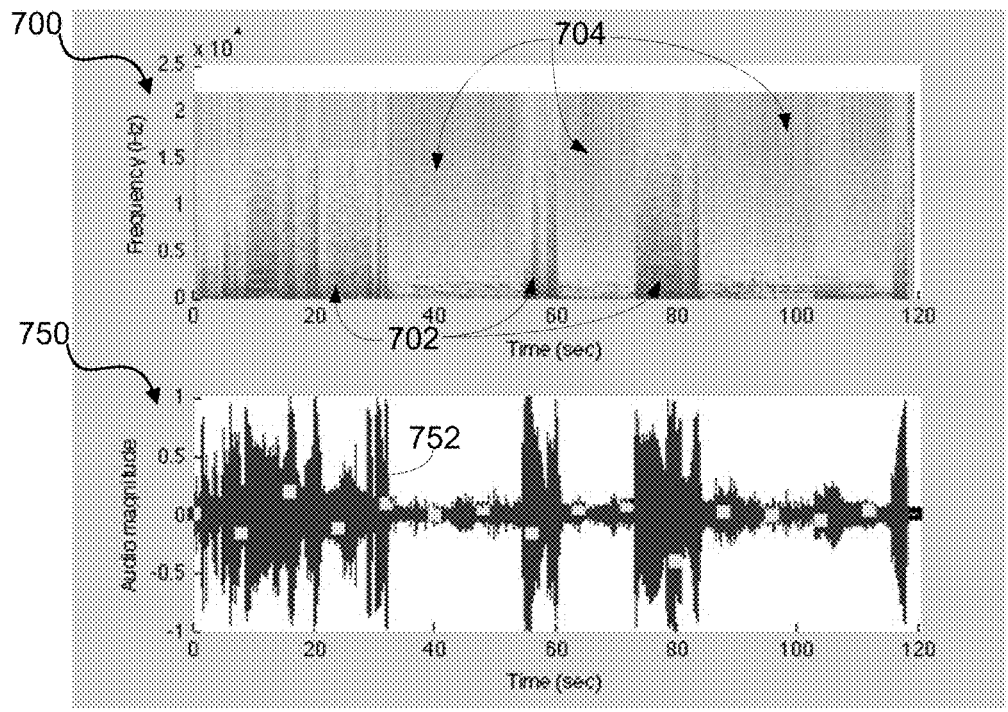
FIG. 7 illustrates an example Spectrogram and Pulse Code Modulation of an audio signal according to a method for identifying transitions in audio signals according to one embodiment.

As shown in FIG. 6, the method 600 begins when processor 102 performs a Fast Fourier Transform (FFT) of the audio signal. In some embodiments, the FFT is used to determine a spectrogram of the audio signal. The spectrogram comprises a plot of the FFT of the Audio Signal in small time windows. In some embodiments, the spectrogram is represented in a three dimensional plot with time in one axis, frequency in another, and amplitude of the specific frequencies in the third axis. In some embodiments, a spectrogram may be used to determine transitions within the audio signal. An example two dimensional spectrogram of an audio signal is shown in FIG. 7, as plot 700. The spectrogram comprises a two dimensional plot 700, with the third dimension depicted by the darkness in the plot. The darker sections of the plot that have a higher magnitude (identified by arrows 702), and the sections that are lighter have a lower magnitude (identified by arrow 704).

At step 604, the processor 102 determines a mean value per time window for the transformed signal determined in step 602. In some embodiments, this mean value signal may be stored in a vector. In some embodiments, this vector may be called a MeanSpec.

At step 606, the processor 102 normalizes the mean values of the transformed signal determined in step 604. In some embodiments, the values are normalized to between 0 and 1. In other embodiments, the values are normalized values between −1 and 1.

In some embodiments, not shown in FIG. 6, the normalized signal may be filtered. In some embodiments, the signal may be filtered with a low pass filter at relatively low value in the audible range, e.g., 100 Hz or 200 Hz. In some embodiments, this filtering may remove noise in the signal.

Figure 8:
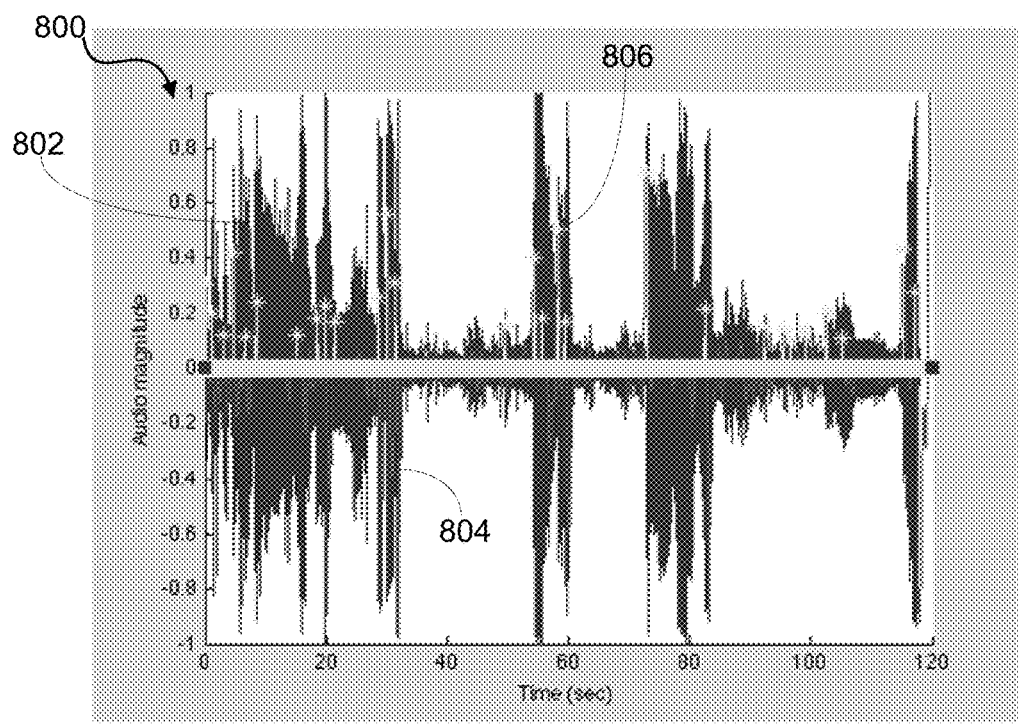
FIG. 8 illustrates the Derivative Signal of an audio signal according to one method for identifying transitions in audio signals according to one embodiment.

Next processor 102 takes the derivative of the data in the normalized signal 608. In some embodiments, this data may be stored in a new signal DerMeanSpec. A plot of an example DerMeanSpec is shown in FIG. 8 as line 804 in plot 800. The example audio signal from which this DerMeanSpec was determined is shown as line 802 in plot 800.

Then processor 102 determines the local maximum values within the derivative signal (DerMeanSpec) 610. In some embodiments, each of these local maximum values correspond to transitions in magnitude. A plot of the local maximum found in an example DerMeanSpec is shown in FIG. 8 as line 806 in plot 800. In some embodiments, these local maximum represent the locations of transitions in the audio signal.

Turning now to FIG. 7, as mentioned above, FIG. 7 illustrates an example Spectrogram and Pulse Code Modulation of an audio signal according to one method for identifying transitions in audio signals according to one embodiment. The spectrogram comprises a two dimensional plot 700, with the third dimension depicted by the darkness in the plot. The darker sections of the plot that have a higher magnitude (identified by arrows 702), and the sections that are lighter have a lower magnitude (identified by arrow 704). As shown in FIG. 7, plot 750 comprises a view of the Pulse Code Modulation (PCM) 752 of the audio signal shown in plot 700.

Turning now to FIG. 8, as mentioned above, FIG. 8 illustrates a plot 800 of the Derivative Signal of an audio signal according to one method for identifying transitions in audio signals according to one embodiment. As shown in FIG. 8, the audio signal is represented by black line 802, the derivative signal (mentioned above as the DerMeanSpec) is represented by gray line 804, and the local maximum found in DerMeanSpec is represented by light gray line 806, which includes starburst at each of its peak values. In FIG. 8, not all the local maximum values are shown. Rather, as shown in FIG. 8, only the local maximum values with a value that exceeded a predetermined delta value with respect to the previous local minima are shown. In some embodiments, these local maximum represent the locations of transitions in the audio signal. Thus, in some embodiments, the size of the delta value may be adjusted in order to vary the magnitude of the transitions detected in the audio signal.

Figure 9:
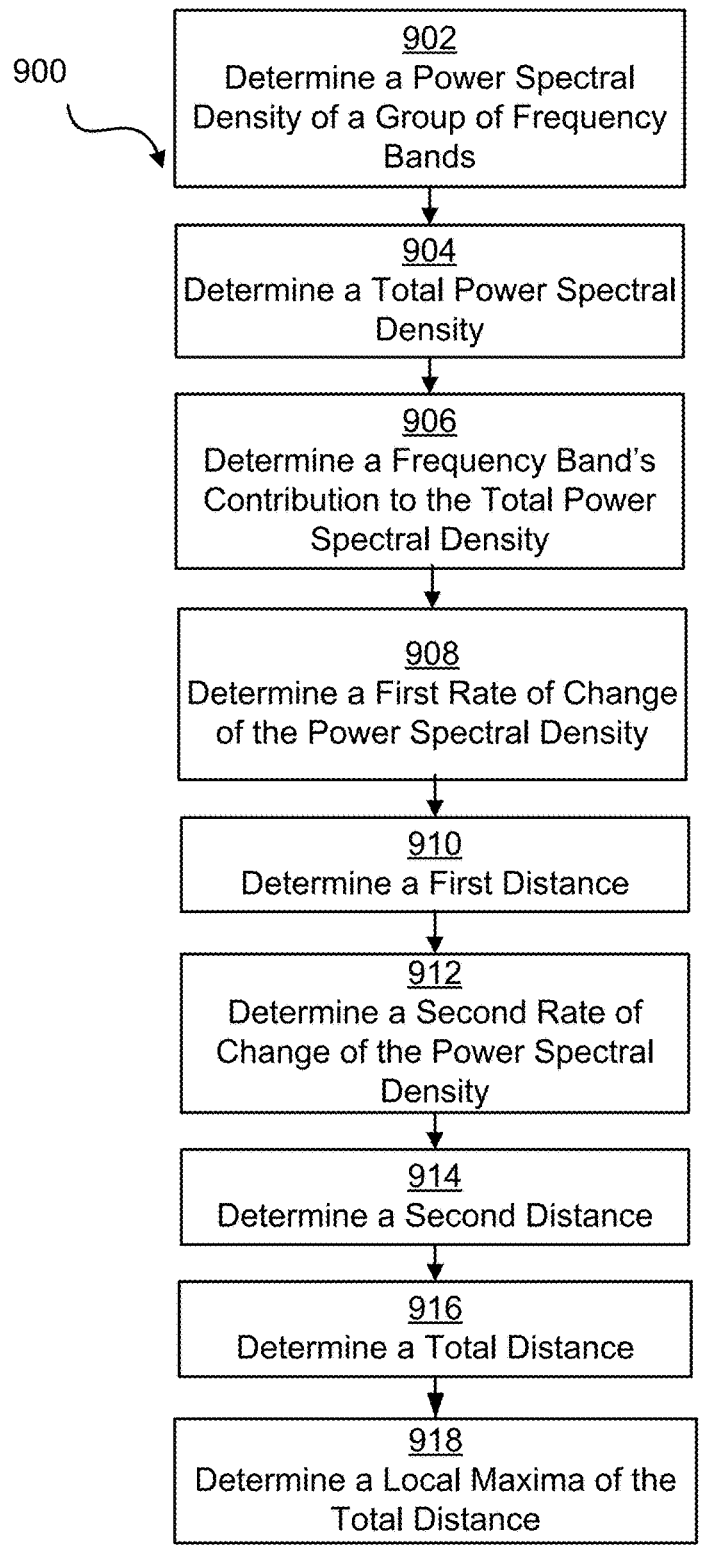
FIG. 9 illustrates a flow chart for a method for identifying transitions in audio signals according to one embodiment.

Turning now to FIG. 9, FIG. 9 is a flowchart showing an illustrative method 900 for identifying transitions in audio signals. This method may be used for determining haptic effects associated with transitions in audio signals. In some embodiments, the steps shown in FIG. 9 may be implemented in program code executed by a processor, for example, the processor in a general purpose computer, mobile device, or server. In some embodiments, these steps may be implemented by a group of processors. In some embodiments the steps shown in FIG. 9 may be performed in a different order. Alternatively, in some embodiments, one or more of the steps shown in FIG. 9 may be skipped, or additional steps not shown in FIG. 9 may be performed. The steps in FIG. 9 are described with regard to an audio signal. However, in some embodiments, the method may be used to determine haptic effects associated with other types of signals, e.g., pressure, acceleration, velocity, or temperature signals.

As shown in FIG. 9, the method 900 begins at step 902 when processor 102 determines the Power Spectral Density (PSD) of a group of frequency bands for consecutive time windows tw(k) in the audio signal. Further, in some embodiments, each band may be represented at a time window tw(k) by the sum of its frequencies PSD values, PSD(band(j),tw(k)).

Next the processor 102 determines a Total Power Spectral Density 904 for each time window. In some embodiments, the processor 904 may determine the Total Power Spectral Density for the distinct frequency bands that form each of the consecutive frequencies as the sum of all the bands' PSDs at time window tw(k). In some embodiments, the set of all these bands may cover the whole range of frequencies in the PSD.

Next, the processor 102 determines a frequency band's contribution to the Total Power Spectral Density 906. In some embodiments, this may comprise determining the contribution of each band's PSD in the total PSD of the audio signal in the time window tw(k). In some embodiments, this may comprise dividing the value of the PSD of a band at a time window, by the sum of all band's PSD values at that time window: weight(band(j),tw(k))=PSD(band(j),tw(k))/sum of all bands PSDs at tw(k).

Then the processor 102 determines a First Rate of Change of the Power Spectral Density 908. In some embodiments, determining a rate of change may comprise determining a rate of change 'R1' in each band's PSD between any two consecutive time windows tw(k) and tw(k+1): R1(band(j),tw(k))=abs(PSD(band(j),tw(k+1))−PSD(band(j),tw(k)))/PSD(band(j),tw(k)).

Next, the processor 102 determines a first distance 910. In some embodiments, the first distance may be equal to the sum of all frequency bands' rates of change between two consecutive time windows tw(k) and tw(k+1) weighted by the contribution of each band in the signal: dist1(tw(k))=sum of (R1(band(j),tw(k))*weight(band(j),tw(k))) for all bands band(j).

Then the processor 102 determines a second rate of change of the Power Spectral Density 912. In some embodiments, this second rate of change, 'R2' may comprise a rate of change in each band's PSD between time windows tw(k) and tw(k+2): R2(band(j), tw(k))=abs(PSD(band(j),tw(k+2))−PSD(band(j),tw(k)))/PSD(band(j),tw(k)).

Next, the processor 102 determines a second distance 914. In some embodiments, this second distance may be equal to the sum of each band's rate of change between time windows tw(k) and tw(k+2) weighted by the contribution of each band in the signal: dist2(tw(k))=sum for all bands band(j) of R2(band(j),tw(k))*weight(band(j),tw(k))).

Then at step 916, the processor 102 determines a total distance. In some embodiments, the total distance may comprise the distance between consecutive time windows tw(k) and tw(k+1). In some embodiments, the processor 102 may make this determination by multiplying the first distance, by the second distance: dist(tw(k))=dist1 (tw(k))*dist2(tw(k)).

Then processor 102 determines a local maximum of the total distance 918. In some embodiments, this local maximum indicates a shift in the frequency profile of the time windows. In some embodiments, this results in a representation of a transition within the audio signal.

Figure 10:
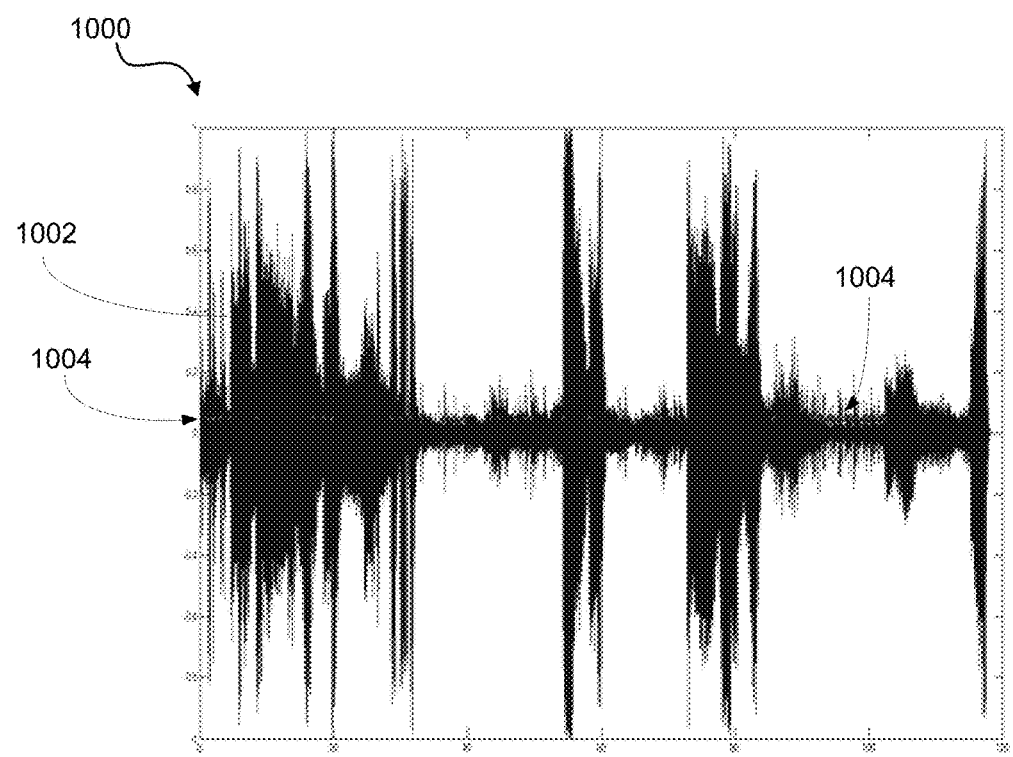
FIG. 10 illustrates an example transition detection signal according to one embodiment of a method for identifying transitions in audio signals.

An example audio signal 1002 is shown in FIG. 10. As shown in FIG. 10, the local maximums that represent transitions in the audio signal 1002 are marked with dots 1004. Further, in some embodiments, the system may be tuned to recognize only local maximum values that are above a certain threshold and separated by a minimum duration. In some embodiments, this enables the system to be tuned to detect only transitions that are above a certain level.

In some embodiments, widening the PSD window size we will enable detection of larger scene changes. Further, in some embodiments, narrowing the window enables detection of smaller transitions (e.g., cycles of a repetitive note or beats) but at the cost of a higher computation time. Further, in some embodiments, multiple different distances between time windows may be used, e.g., Euclidean distance or Mahalanobis distance.

In some embodiments, method 900 may be modified to have an iterative approach. In some embodiments, this may provide a more accurate determination without a corresponding increase in computation cost. In such an embodiment, the method 900 may be performed iteratively to estimate a precision of x (in ms), by performing each step with a window size of y(1) where y(1)>x. Then continue to perform the operation n times until y(n−1)<=x. For each of the transition points detected in iteration n−1:
  Take a section of the signal with a width of 2*y(n−1) centered at the transition point.
  For each of these sections perform steps 902 to 916 with a window size y(n)=y(n−1)/2.

The maximum value of total distance corresponds to the refined position of the transition.

Advantages of Systems and Methods for Generating Haptic Effects Associated with Audio Signals There are numerous advantages of generating haptic effects associated with transitions in audio signals. A simple filtering technique (e.g., low pass filtering) may be used to automatically determine haptic effects from an audio or an AV file. However, such a method may result in poor synchronization between the resulting haptic effects and the audio events. This may result in lower quality haptic effects as perceived by the user.

Embodiments of systems and methods for generating haptic effects associated with transitions in audio signals provide a better synchronization of haptic effects with events in the audio or AV file. In some embodiments, a strong synchronization may occur if the haptic effect starts at the same time the audio or AV event starts. In some embodiments, this may be the case even if the strength of the audio or AV event is low. In some embodiments, the haptic effect is above a certain strength to ensure the user perceives the two events as being concurrent. A simple filtering technique may provide only a low strength effect, and the ramp-up of the effect may be too slow to allow the user to fully perceive the effect. Each of these problems may be solved by embodiments described herein.

Further embodiments of systems and methods for generating haptic effects associated with transitions in audio signals may be used to find and annotate the transitions within an audio or AV file. These transitions can later be associated with haptic effects using other methods or by another user/designer. Further, systems and methods for generating haptic effects associated with transitions in audio signals allow for more effective automatic conversion of the audio signal into a haptic track. This may enable a haptic track to be developed based on an audio track in advance of distribution of the audio track. Such an embodiment may enable the haptic track to be distributed along with the audio track, and thus provide an additional revenue stream for the creator or distributor of the audio track.

Further, embodiments of systems and methods for generating haptic effects associated with transitions in audio signals enable an audio signal to be properly segmented. In some embodiments, frequency content analysis and filtering may allow an audio signal to be analyzed segment by segment. This may provide for a more detailed and thus more compelling haptic track of haptic effects associated with each segment.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system for outputting haptic effects comprising:
   a processor configured to:
      receive a signal;
      determine a haptic effect based in part on the signal by:
         identifying one or more transitions in the signal by:
            determining a contribution of one or more frequency bands of the signal to a Total Power Spectral Density by comparing a value of a Power Spectral Density of each frequency band to the Total Power Spectral Density per time window;
            determining the Power Spectral Density of one or more frequency bands within a first time window and a second time window;
            determining a first rate of change of the Power Spectral Density of the one or more frequency bands from the first time window to the second time window; and
            determining a first distance equal to a first sum of the first rate of change weighted by a contribution of each frequency band;
         applying one or more haptic markers to the one or more transitions; and
         synching one or more haptic effects to the one or more haptic markers; and
      output a haptic signal associated with the haptic effect.

2. The system of claim 1, wherein the signal comprises one or more of an: audio signal, pressure signal, or acceleration signal.

3. The system of claim 1, further comprising:
   an audio output device configured to receive the signal and output an audible effect; and
   a haptic output device in communication with the processor, the haptic output device configured to receive the haptic signal and output the haptic effect.

4. The system of claim 1, further comprising a data store configured to receive the haptic signal and store the haptic effect in a haptic track.

5. The system of claim 1, wherein the transitions comprise one or more of: a change in frequency, a change in amplitude, or a repetition of a frequency and amplitude.

6. The system of claim 1, wherein the haptic effect comprises one or more of: a variation in coefficient of friction, a simulated texture, or a vibration.

7. The system of claim 1, wherein identifying one or more transitions further comprises:
   performing a Fast Fourier Transform on the signal taken at a series of time intervals;
   determining a mean value of the transformed signal for each of the time intervals;
   normalizing each of the mean values to create a normalized signal;
   determining a derivative of the normalized signal to create a derivative signal; and
   determining one or more local maximum values within the derivative signal.

8. The system of claim 7, further comprising filtering the normalized signal.

9. The system of claim 7, wherein the one or more local maximum values comprises the one or more transitions.

10. The system of claim 1, wherein identifying one or more transitions further comprises:
    determining a Total Power Spectral Density by summing the Power Spectral Density values for the one or more frequency bands per time window, wherein the first time window and second time window are consecutive time windows in the signal;
    determining a second rate of change of the Power Spectral Density of the one or more frequency bands from the first time window to a third time window, wherein the second time window and the third time window are consecutive time windows in the signal;
    determining a second distance equal to a second sum of the second rate of change at each frequency band weighted by the contribution of each frequency band;
    determining a total distance between the first time window and the second time window by multiplying the first distance by the second distance; and
    determining a local maximum.

11. The system of claim 10, wherein the local maximum comprises a local maximum of the first distance, second distance, or total distance.

12. The system of claim 10, wherein the local maximum comprises one or more transitions in the signal.

13. A method for outputting haptic effects comprising:
    receiving a signal;
    determining a haptic effect based in part on the signal by:
       identifying one or more transitions in the signal by:
          determining a contribution of one or more frequency bands of the signal to a Total Power Spectral Density by comparing a value of a Power Spectral Density of each frequency band to the Total Power Spectral Density per time window;
          determining the Power Spectral Density of one or more frequency bands within a first time window and a second time window;
          determining a first rate of change of the Power Spectral Density of the one or more frequency bands from the first time window to the second time window; and determining a first distance equal to a first sum of the first rate of change weighted by a contribution of each frequency band;

applying one or more haptic markers to the one or more transitions; and synching one or more haptic effects to the one or more haptic markers; and outputting a haptic signal associated with the haptic effect.

14. The method of claim 13, wherein the signal comprises one or more of an: audio signal, pressure signal, or acceleration signal.

15. The method of claim 13, further comprising:
outputting an audible effect; and
outputting the haptic effect.

16. The method of claim 13, further comprising storing the haptic signal in a haptic track.

17. The method of claim 13, wherein the haptic effect comprises one or more of: a variation in coefficient of friction, a simulated texture, or a vibration.

18. The method of claim 15, wherein the transitions comprise one or more of: a change in frequency, a change in amplitude, or a repetition of a frequency and amplitude.

19. The method of claim 15, wherein identifying one or more transitions further comprises:

performing a Fast Fourier Transform on the signal within a series of time intervals;

determining a mean value of the transformed signal for each of the time intervals;

normalizing each of the mean values to create a normalized signal;

determining a derivative of the normalized signal to create a derivative signal; and determining one or more local maximum values within the derivative signal.

20. The method of claim 19, further comprising filtering the normalized signal.

21. The method of claim 19, wherein the one or more local maximum values comprises the one or more transitions.

22. The method of claim 15, wherein identifying one or more transitions further comprises:

determining a Total Power Spectral Density by summing the Power Spectral Density values for the one or more frequency bands per time window, wherein the first time window and second time window are consecutive time windows in the signal;

determining a second rate of change of the Power Spectral Density of the one or more frequency bands from the first time window to a third time window, wherein the second time window and the third time window are consecutive time windows in the signal;

determining a second distance equal to a second sum of the second rate of change at each frequency band weighted by the contribution of each frequency band;

determining a total distance between the first time window and the second time window by multiplying the first distance by the second distance; and determining a local maximum.

23. The method of claim 22, wherein the local maximum comprises a local maximum of the first distance, second distance, or total distance.

24. The method of claim 22, wherein the local maximum comprises one or more transitions in the signal.

25. A non-transitory computer readable medium comprising program code, which when executed by a processor, is configured to cause the processor to:

receive a signal;

determine a haptic effect based in part on the signal by:

identifying one or more transitions in the signal by determining a contribution of one or more frequency bands of the signal to a Total Power Spectral Density by comparing a value of a Power Spectral Density of each frequency band to the Total Power Spectral Density per time window;

determining the Power Spectral Density of one or more frequency bands within a first time window and a second time window;

determining a first rate of change of the Power Spectral Density of the one or more frequency bands from the first time window to the second time window; and determining a first distance equal to a first sum of the first rate of change weighted by a contribution of each frequency band;

applying one or more haptic markers to the one or more transitions; and synching one or more haptic effects to the one or more haptic markers; and output a haptic signal associated with the haptic effect.

26. The non-transitory computer readable medium of claim 25, wherein the signal comprises one or more of an: audio signal, pressure signal, or acceleration signal.

27. The non-transitory computer readable medium of claim 25, further comprising program code, which when executed by a processor is configured to cause the processor to:

output an audible effect; and
output the haptic effect.

28. The non-transitory computer readable medium of claim 25, further comprising program code, which when executed by a processor is configured to cause the processor to store the haptic signal in a haptic track.

29. The non-transitory computer readable medium of claim 25, wherein the haptic effect comprises one or more of: a variation in coefficient of friction, a simulated texture, or a vibration.

30. The non-transitory computer readable medium of claim 27, wherein the transitions comprise one or more of: a change in frequency, a change in amplitude, or a repetition of a frequency and amplitude.

31. The non-transitory computer readable medium of claim 27, wherein identifying one or more transitions further comprises:

performing a Fast Fourier Transform on the signal within a series of time intervals;

determining a mean value of the transformed signal for each of the time intervals;

normalizing each of the mean values to create a normalized signal;

determining a derivative of the normalized signal to create a derivative signal; and determining one or more local maximum values within the derivative signal.

32. The non-transitory computer readable medium of claim 31, wherein the one or more local maximum values comprises the one or more transitions.

33. The non-transitory computer readable medium of claim 31, further comprising filtering the normalized signal.

34. The non-transitory computer readable medium of claim 27, wherein identifying one or more transitions further comprises:

determining a Total Power Spectral Density by summing the Power Spectral Density values for the one or more frequency bands per time window, wherein the first time window and second time window are consecutive time windows in the signal;

determining a second rate of change of the Power Spectral Density of the one or more frequency bands from the first time window to a third time window, wherein the second time window and the third time window are consecutive time windows in the signal;

determining a second distance equal to a second sum of the second rate of change at each frequency band weighted by the contribution of each frequency band;

determining a total distance between the first time window and the second time window by multiplying the first distance by the second distance; and determining a local maximum.

35. The non-transitory computer readable medium of claim 34, wherein the local maximum comprises one or more transitions in the signal.

36. The non-transitory computer readable medium of claim 34, wherein the local maximum comprises a local maximum of the first distance, second distance, or total distance.

* * * * *